(12) United States Patent
Sabir (10) Patent No.: US 8,984,226 B2
(45) Date of Patent: Mar. 17, 2015

(54) LOAD BALANCING BASED UPON DATA USAGE

(75) Inventor: Kenneth S. Sabir, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 13/168,058

(22) Filed: Jun. 24, 2011

(65) Prior Publication Data
US 2012/0331229 A1 Dec. 27, 2012

(51) Int. Cl.
*G06F 12/08* (2006.01)
*G06F 9/50* (2006.01)

(52) U.S. Cl.
CPC .................................... *G06F 9/5083* (2013.01)
USPC .................. 711/118; 711/E12.016; 709/201; 709/203; 709/213

(58) Field of Classification Search
USPC ........... 711/118, E12.016; 709/201, 203, 213
See application file for complete search history.

(56) References Cited

U.S. PATENT DOCUMENTS

2009/0307332 A1* 12/2009 Litwin ........................... 709/219
2012/0151100 A1* 6/2012 Roche et al. ..................... 710/16

OTHER PUBLICATIONS

Cairong, Y., et al., "Study on Web cluster server with content-aware request distribution," Journal of Xi'an Jiaotong University, vol. 39, No. 4, 380-3, Apr. 2005, retrieved from the Internet: <http://en.cnki.com.cn/Article_en/CJFDTOTAL-XAJT20050400C.htm>.

Qu, W., et al., "Dynamically Selecting Distribution Strategies for Web Documents According to Access Pattern," Int'l J. of Computer Science and Network Security, vol. 6, No. 3A, Mar. 2006, retrieved from the Internet: <http://paper.ijcsns.org/07_book/200603/200603A05.pdf>.

Ng, B. C., et al., "Document distribution algorithm for load balancing on an extensible Web server architecture," Proc. First IEEE/ACM Int'l. Symposium on Cluster Computing and the Grid, 140-7, 2001, retrieved from the Internet: <http://citeseerx.ist.psu.edu/viewdoc/download?doi=10.1.1.20.403&rep=rep1&type=pdf>.

Park, J.H., et al., "Logically clustered architectures for networked databases," ICDCS, Distributed and Parallel Databases, vol. 10, No. 2, Sep. 2001, retrieved from the Internet: <http://wotan.liu.edu/docis/lib/goti/rclis/dbl/dipada/(2001)10%253A2%253C161%253ALCAFND%253E/naxos.poly.edu%252F~vinay%252FPAPERS%252FDAPD-LCC.pdf>.

Chen, L., et al., "COWES: clustering Web users based on historical Web Sessions," In Database Systems for Advanced Applications, Springer Berlin / Heidelberg, 541-556, Jun. 2006, retrieved from the Internet: <http://citeseerx.ist.psu.edu/viewdoc/download?doi=10.1.1.103.1881&rep=rep1&type=pdf>.

* cited by examiner

*Primary Examiner* — Jasmine Song
(74) *Attorney, Agent, or Firm* — Cuenot, Forsythe & Kim, LLC (57) ABSTRACT

A method of load balancing can include segmenting data from a plurality of servers into usage patterns determined from accesses to the data. Items of the data can be cached in one or more servers of the plurality of servers according to the usage patterns. Each of the plurality of servers can be designated to cache items of the data of a particular usage pattern. A reference to an item of the data cached in one of the plurality of servers can be updated to specify the server of the plurality of servers within which the item is cached.

14 Claims, 4 Drawing Sheets

LOAD BALANCING BASED UPON DATA USAGE

BACKGROUND

One or more embodiments disclosed within this specification relate to load balancing. More particularly, one or more embodiments relate to load balancing based upon data usage.

Content management systems typically utilize caching techniques to provide faster response times when serving requested data. Storing data in a cache, e.g., caching data, can reduce the load placed upon a content management system that is tasked with serving data to clients. For example, a Website can include a plurality of different pages. Frequently requested pages can be stored in a cache memory of the content management system. A cached page can be delivered to the requesting client in less time than a page that is not cached.

As a Website grows in size, e.g., number of pages, and/or a larger number of users begins to access the Website, memory caching can become less effective. An increase in the size of a Website can result in a smaller percentage of that Website being available in the cache memory of the content management system resulting in a potential reduction in the cache hit rate and a corresponding reduction in content management system performance. Increases in the number of users of a Website can be handled by clustering multiple servers together to handle the increased load. Each server in the server cluster can maintain a cache memory. Maintaining cache memories across each server in the server cluster can create significant network traffic thereby reducing efficiency of the system.

BRIEF SUMMARY

One or more embodiments disclosed within this specification relate to load balancing and, more particularly, to load balancing based upon data usage.

An embodiment can include a method of load balancing. The method can include segmenting data from a plurality of servers into usage patterns determined from accesses to the data. Items of the data can be cached in one or more of the plurality of servers according to the usage patterns. Each of the plurality of servers can be designated to cache items of the data of a particular usage pattern. The method also can include updating, using a processor, a reference to an item of the data specifying the server of the plurality of servers within which the item is cached.

Another embodiment can include a method of load balancing. The method can include determining usage patterns for accessing data from a plurality of servers. The data from the plurality of servers can be segmented into the usage patterns. Items of the data can be continually distributed in caches of one or more of the plurality of servers according to the usage patterns determined on an ongoing basis. Each of the plurality of servers can be designated to cache items of the data of a particular usage pattern. Further, a reference to an item of the data can be dynamically updated, using a processor, to specify the server of the plurality of servers within which the item is cached.

Another embodiment can include a system. The system can include a memory storing computer readable program code and a processor coupled to the memory. Responsive to executing the computer readable program code, the processor can be configured to execute operations relating to load balancing. The operations can include the various steps and functions disclosed within this specification.

Another embodiment can include a computer program product for load balancing. The computer program product can include a computer readable storage medium having computer readable program code embodied therewith. The computer readable program code can include computer readable program code configured to perform the various steps and functions disclosed within this specification.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to load balancing and, more particularly, to load balancing based upon data usage. Usage of data that is maintained within a plurality of different servers can be evaluated and analyzed over time as clients access the data. Usage patterns can be determined based upon the analysis. The data stored within the plurality of servers can be segmented according to the usage patterns to determine which items of data are to be stored within the various caches of the servers. The usage patterns can be continually evaluated thereby allowing the segmentation of the items of data to be updated in accordance with the evolving usage patterns. References to items of the data can be updated based upon the particular location, e.g., server, within which the item is cached. Clients requesting data can be directed to particular servers based upon the usage patterns and, in some cases, identifying information relating to the client that is requesting the data.

Figure 1:
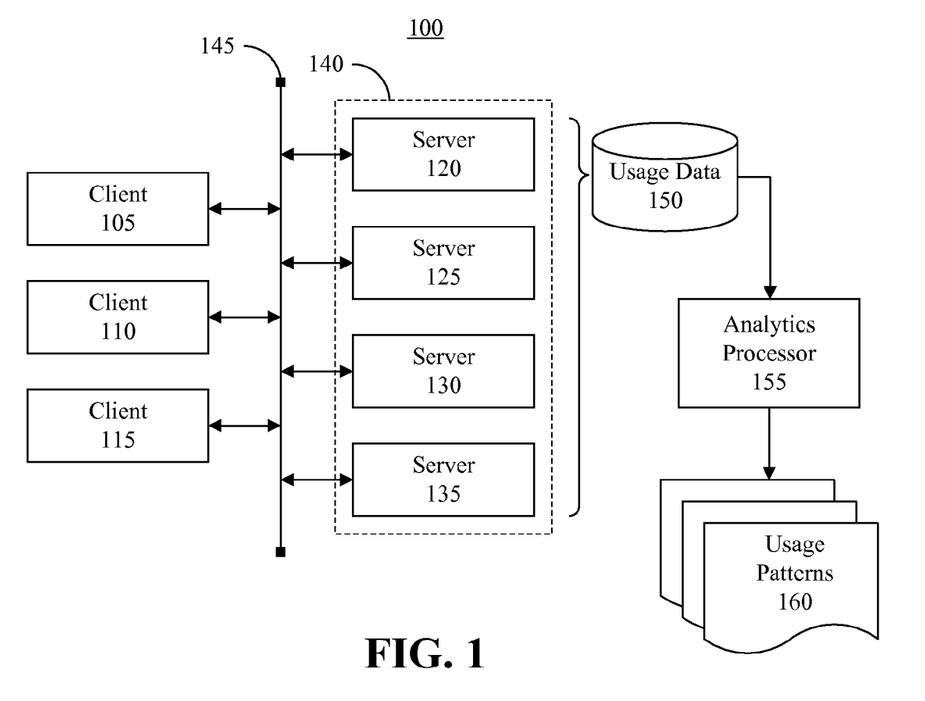
FIG. 1 is a block diagram illustrating a system for load balancing in accordance with an embodiment disclosed within this specification.

FIG. 1 is a block diagram illustrating a system 100 for load balancing in accordance with an embodiment disclosed within this specification. As shown, system 100 can include a plurality of servers formed of servers 120, 125, 130, and 135. Each of servers 120-135 can be implemented as a data processing system. For ease of illustration, servers 120-135 can be collectively referred to as a server cluster 140. System 100 further can include an analytics processor 155, which also can be implemented as a data processing system.

A plurality of clients formed of clients 105, 110, and 115 can communicate with server cluster 140 via a network 145. Each of clients 105-115 can be implemented as a data processing system. Further, each of clients 105-115 can be configured to request data, e.g., particular items of data, from various ones of servers 120-135.

For example, server cluster 140 can be configured to host a Website where each of servers 120-135 can store one or more individual pages of the Website. Alternatively, each of servers 120-135 can store a complete set of the pages of the Website. Analytics processor 155 can implement load balancing among servers 120-135 to direct requests from clients 105-115 to the appropriate one of servers 120-135.

Usage data 150 represents usage data for each of servers 120-135 collectively that can be stored within a computer readable storage medium. Each of servers 120-135, for example, can transmit usage data for that server to be stored within, or as part of, usage data 150. In one aspect, usage data 150 can be stored within a data storage node that is communicatively linked with server cluster 140 and analytics processor 155. In another aspect, usage data 150 can be stored within, or be part of, one or more of servers 120-135, within a separate and independent data processing system, or within the data processing system within which analytics processor 155 executes or is part. In this regard, it should be appreciated that reference to the "analytics processor" can refer to the particular data processing system in which the analytics processor executes.

In general, usage data 150 can include the data needed by analytics processor 155 to determine usage patterns of server cluster 140. For example, usage data 150 can include data necessary for performing Web analytics. Usage data 150 can include data necessary for performing off-site analytics, on-site analytics, or both. Off-site analytics generally refers to Web measurement techniques relating to a Website as a whole, for example, across multiple clients or users. On-site analytics, in general, refers to the measurement of each client or user navigating through the Website. On-site analytics can specify, for example, which pages are viewed by each client and the like.

In this regard, usage data 150 can include any of a variety of different types of data that can be collected through any of a variety of known data collection techniques. A non-exhaustive list of data and/or data collection techniques can include, but is not limited to, log file analysis; page tagging; electronic mail response rates; user performance data such as click heat mapping; custom metrics; number of client requests to a server; page views and/or visits (or sessions); call backs; Internet Protocol (IP) Intelligence directed to mapping the Internet and cataloging IP addresses by parameters such as geographic location (country, region, state, city, and/or postcode), connection type, Internet Service Provider, proxy information, etc.; click analytics; or the like can be used. As discussed, the list of data and data collection techniques provided herein is not intended to be limiting, but rather to provide a variety of examples to facilitate a better understanding of the one or more embodiments disclosed within this specification.

Analytics processor 155 can evaluate usage data 150 to determine usage patterns 160. In general, usage patterns 160 can specify use or navigational paths of clients 105-115 through various items of data stored within server cluster 140. For example, a usage pattern can be determined based upon, or from, a path taken through one or more pages of a Website that a group of users have traversed or navigated. For purposes of illustration, consider the case of a Website, e.g., a bank Website, that offers a variety of pages relating to classifications A (e.g., the stock market), B (e.g., online banking), and C (e.g., mortgages). Within this specification, the word "classification" can be used to refer to subject matter, topics, functional areas, or other organizational metric for content of a Website, e.g., pages, files, etc. A usage pattern can specify that users, e.g., some percentage of users, that access pages of classification A routinely access one or more pages of classification B. In another example, a usage pattern can specify that users that access pages of classification C do not routinely access pages of other classifications. Accordingly, the number and variety of usage patterns 160 is limited only in terms of the number of classifications included in the Website and the granularity desired for the usage patterns themselves.

It should be appreciated that the particular number of clients 105-115 and the particular number of servers 120-135 within server cluster 140 shown within FIG. 1 are not intended as limitations of the one or more embodiments disclosed within this specification. Server cluster 140 can serve data to more or fewer clients than illustrated in FIG. 1. Further, server cluster 140 can include fewer or more servers than illustrated in FIG. 1.

Figure 2:
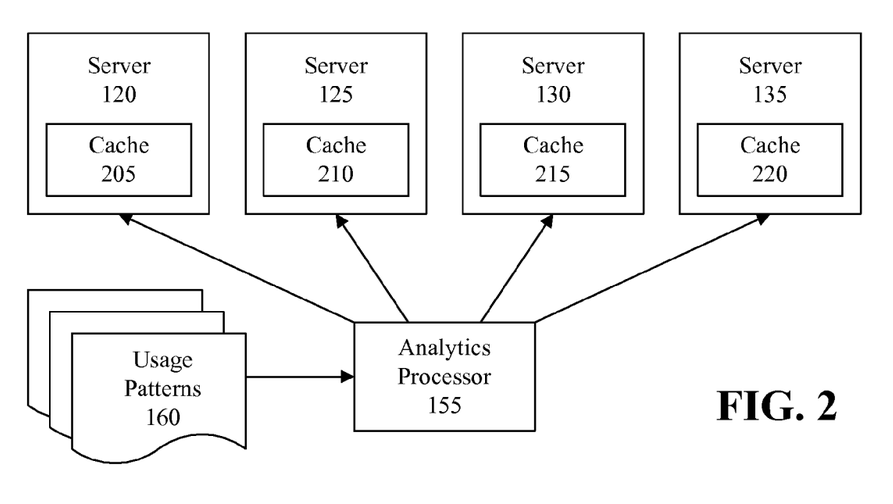
FIG. 2 is a block diagram illustrating another aspect of the system of FIG. 1 in accordance with another embodiment disclosed within this specification.

FIG. 2 is a block diagram illustrating another aspect of the system of FIG. 1 in accordance with another embodiment disclosed within this specification. As shown, each of servers 120-135 includes a respective one of caches 205, 210, 215, and 220. Having determined a plurality of usage patterns 160, analytics processor 155 can categorize or segment data stored within server cluster 140 into one or more groups each corresponding to one or more of usage patterns 160. Thus, the items of the data stored on server cluster 140 can be segmented into usage patterns 160.

FIG. 2 illustrates that analytics processor 155 can be configured to communicate with each of servers 120-135 to instruct one or more or each respective one of servers 120-135 as to what items of data are to be loaded within the cache of that server. For purposes of illustration, consider the case in which four different usage patterns are determined by analytics processor 155. In this example, each of servers 120-135 can be assigned to a particular usage pattern. The items of data that are to be loaded or maintained within the cache of each of servers 120-135 will belong to the particular usage pattern assigned to that server.

For example, usage pattern A can be assigned server 120. Accordingly, cache 205 can store only items of data that are included within, or selected from, usage pattern A. Usage pattern B can be assigned to server 125. Accordingly, cache 210 can store only items of data that are included within, or selected from, usage pattern B. Usage pattern C can be assigned to server 130. Accordingly, cache 215 can store only items of data that are included within, or selected from, usage pattern C. Finally, usage pattern D can be assigned to server 135. Accordingly, cache 214 can store only items of data that are included within, or selected from, usage pattern D.

In further illustration, consider the case in which usage pattern A indicates that clients that visit pages classified as online banking also visit pages classified as mortgage. In that case, the cache of the server associated with, or assigned to, usage pattern A can be populated with pages, e.g., the most popular pages, selected from both classifications, i.e., pages for online banking and pages for mortgages.

It should be appreciated that the correlation between usage patterns and servers need not be one-to-one as described with reference to FIG. 2. In another example, a single server can be assigned two or more usage patterns. In that case, the cache of the server can be populated with items selected from each of the usage patterns. In another example, a same usage pattern can be assigned to more than one server. In still another example, a particular classification can be included in more than one usage pattern.

Referring again to FIGS. 1 and 2, usage data 150 relating to server cluster 140 can be continually collected and updated over time. Similarly, analytics processor 155 can continually evaluate usage data 150 to determine new, e.g., updated, usage patterns 160 over time. In this regard, usage patterns 160 can continue to evolve as usage of server cluster 140 evolves over time by clients 105-115. Accordingly, the segmentation of the items of data into usage patterns can be updated as well as the particular data items stored within each one of caches 205-220 over time.

In another embodiment, analytics processor 155 can be configured to control and/or regulate caching for fewer than all servers of server cluster 140. For example, analytics processor 155 can regulate caching and/or updating of references in one, two, or three servers of server cluster 140, e.g., in a subset of server cluster 140 including at least one server. In this regard, analytics processor 155 can segment data into usage patterns and assign usage patterns to one, two, three, or all servers of server cluster 140 and further direct such servers to update caches as instructed.

Figure 3:
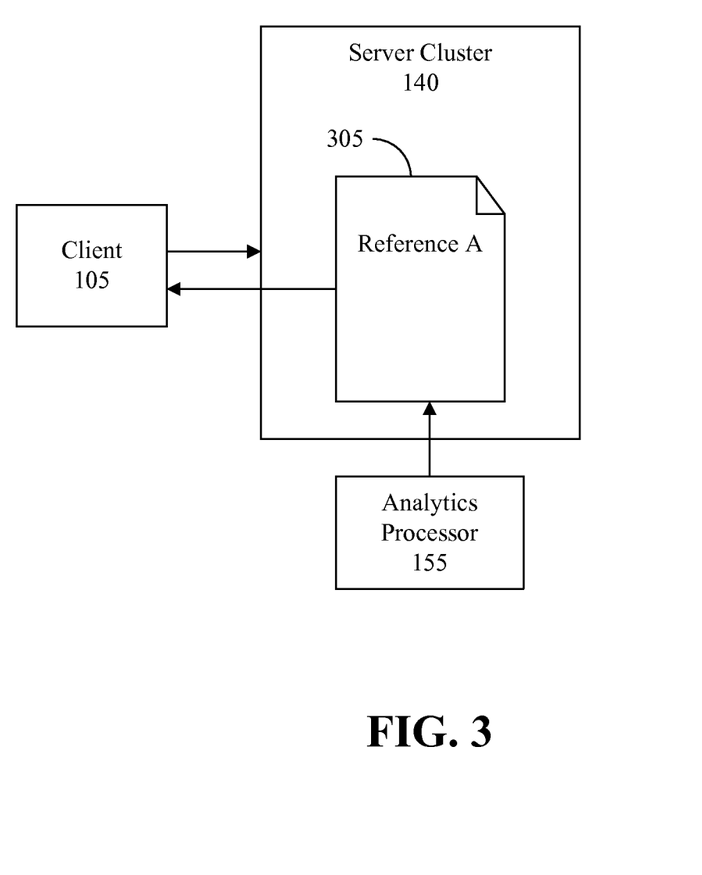
FIG. 3 is a block diagram illustrating another aspect of the system of FIG. 1 in accordance with another embodiment disclosed within this specification.

FIG. 3 is a block diagram illustrating another aspect of the system of FIG. 1 in accordance with another embodiment disclosed within this specification. FIG. 3 illustrates a page 305 that can be a part of a larger Website including a plurality of pages. As an example, page 305 can be a home page of a Web site that a client can request from server cluster 140.

Page 305 can include one or more references such as reference A. Each reference can point to, or specify, an item of data, whether another page, a particular file or files, or the like stored within server cluster 140. For example, each reference can specify a Universal Resource Identifier (URI) that can be implemented in the form of a hyperlink. Analytics processor 155 can be configured to update the URI of one or more references, such as reference A of page 305, to specify an up-to-date location from which the item to which reference A points, e.g., "item A," can be retrieved. More particularly, reference A can be updated to specify a URI corresponding to the particular server in which item A is cached.

In illustration, reference A can correspond to a selectable link, e.g., a visible and selectable object displayed on page 305 that specifies a URI for item A. In general, the URI can specify the particular server within which item A is cached and can be obtained. As noted, the particular server within which item A is cached can change over time under the direction of analytics processor 155 based upon the usage patterns determined by analytics processor 155. Accordingly, responsive to analytics processor 155 updating usage patterns that cause item A to be relocated from the cache of one server to another, analytics processor 155 also can update the URI of reference A of page 305 to point to, or specify, the particular server now caching item A.

Thus, when client 105 requests page 305, the particular URI that is specified by reference A, as updated periodically or from time-to-time by analytics processor 155, can be delivered to client 105. In this manner, analytics processor 155 can dynamically update references to items within a page requested by client 105. As noted, analytics processor 155 can update references dynamically from time-to-time or periodically. In another aspect, processes such as the collection of usage data, determination of usage patterns, segmenting of data, and caching of items of data can be performed periodically, from time-to-time, separately or independently.

The updating of references, as performed by analytics processor 155, can be performed responsive to a client request for a particular page. Thus, analytics processor 155 can dynamically update the references within page 305 requested by client 105 responsive to the request from client 105. Thus, responsive to a request for page 305, analytics processor 155 can update one or more references within page 305 to specify up-to-date cache locations prior to sending page 305 to the client. In another example, page 305 can be dynamically generated responsive to a request. In that case, reference A still can be dynamically determined and/or generated according to the most up-to-date location indicating where item A is cached as maintained and/or determined by analytics processor 155.

By updating references to items of data in this manner, clients are directed to a server that is most likely to have the desired pages cached therein. Referring to FIGS. 1-3, consider the case in which each of a plurality of servers stores the same pages, but that each of the caches of the servers includes or stores different sets of pages. For example, one usage pattern can indicate a high likelihood that a user that requests an online banking page will also request a mortgage page. While each of the servers may have the same content stored in long term storage, only the server assigned the appropriate usage pattern stores frequently used or accessed pages for online banking and mortgages in cache. By directing a client requesting an online banking page to the server likely to have a larger number of potentially desirable pages stored in cache, the performance of server cluster 140 can be increased.

In another aspect, the identity of the client requesting an item of data can be used. As discussed, Web analytics can include the determination, storage, and identification of particular data items accessed by a specific client, e.g., client 105. In this regard, responsive to a request from client 105, client 105 can be identified in terms of correlating the request with a stored history or profile for client 105. Responsive to requesting a page such as page 305, analytics processor 155 can update one or more references contained within page 305 based upon client-specific data prior to sending page 305 to client 105.

In illustration, client 105 can request page 305. Responsive to identifying client 105, analytics processor 155 can determine that client 105 typically visits pages of classification A and pages of classification B. Reference A of page 305 further can point to item A that is within classification A. Analytics processor 155 can update reference A within page 305 to point to the server assigned a usage profile causing that server to cache item A (along with potentially one or more items of classification A) and one or more items of classification B.

Figure 4:
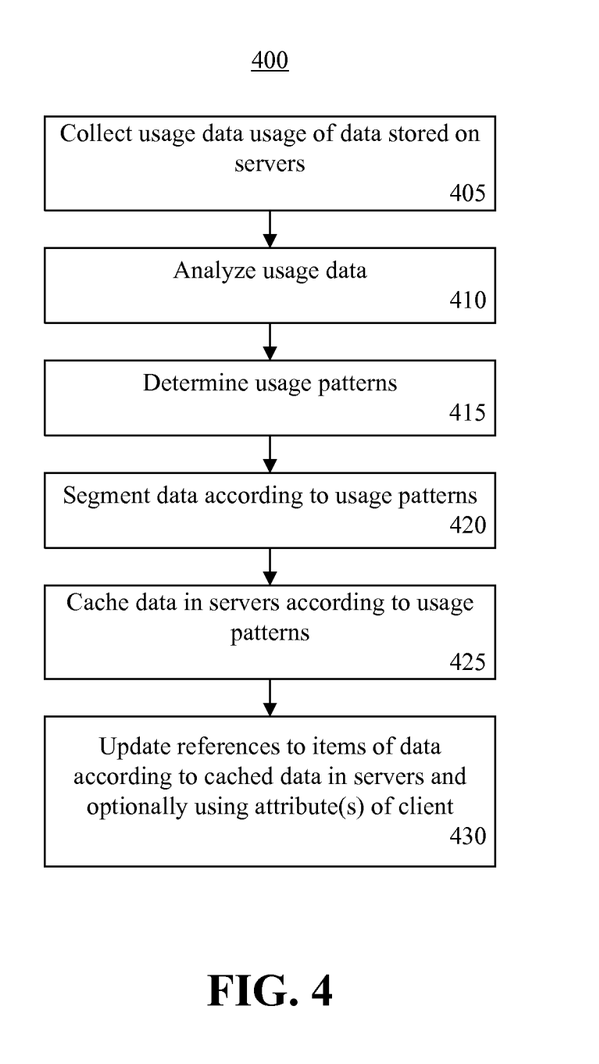
FIG. 4 is a flow chart illustrating a method of load balancing in accordance with another embodiment disclosed within this specification.

FIG. 4 is a flow chart illustrating a method 400 of load balancing in accordance with another embodiment disclosed within this specification. FIG. 4 can be performed by a system as described with reference to FIGS. 1-3. For example, method 400 can be implemented by a data processing system executing an analytics processor as described within this specification.

In step 405, the analytics processor can collect usage data relating to accesses of data stored in servers, e.g., a server cluster, by one or more clients. The usage data can be collected using any of a variety of different methods. For example, each server can be configured to report usage data. In another example, a data processing system such as one executing the analytics processor can be configured to retrieve usage data from various servers. Further, the usage data can include usage data for on-site analytics, data for off-site analytics, or a combination of both.

In step 410, the analytics processor can analyze, e.g., perform Web analytics, on the usage data. In step 415, responsive to the analysis performed in step 410, the analytics processor can determine and generate one or more usage patterns from the usage data.

In step 420, the analytics processor can segment data stored in the server cluster according to the usage patterns. As discussed, the analytics processor can assign or categorize items of data stored in the server cluster into groups, wherein each group is directly correlated with, or represents, a usage pattern. Referring to the Website example, each item of data can correspond to a page, a file, or other item of content that is accessible by a client via a request. As noted, one or more items of data can be segmented into two or more different usage patterns and, as such, be cached within two or more servers.

In step 425, the analytics processor can communicate with the servers and can cause, or instruct, each such server to cache one or more items according to the usage patterns. For example, the analytics processor can assign each usage pattern to a particular server of the server cluster. The particular usage pattern(s) assigned to a server dictate the particular items of data that are to be cached by that server. As noted, each server can include a copy of the items of the data thereby allowing each server to create a cache copy of any items that server is instructed to cache.

It should be appreciated that a variety of techniques can be used to select which items of each usage pattern are to be cached. For example, the most accessed, the top "N" most accessed items of each of a plurality of classifications belonging to a same usage pattern, where "N" represents an integer value, or the like, can be cached. For example, when a usage pattern includes multiple classifications, the number of items belonging to each classification that are cached can vary in accordance with the one or more embodiments disclosed within this specification. The cache of a server, however, can include at least one item from each such classification of the usage pattern assigned to that server.

In step 430, the analytics processor can update the references of one or more pages according to the cached data within each of the servers. More particularly, the analytics processor can update one or more references to items of data within one or more pages of the Website maintained by the server cluster to indicate the particular server within which each item to which an updated reference is cached. Optionally, the updating can be performed using one or more attributes relating to a client issuing a request.

Method 400 can continue to repeat as necessary so that usage data, the determination of usage patterns, the segmentation of data, and the updating of references based upon the caching is performed from time-to-time or periodically to reflect ongoing usage of the server cluster by clients. Accordingly, when a client selects a reference, the reference, e.g., the URI, will point to an up-to-date server including the requested item of data in cache as well as one or more other items determined likely to be requested by the client based upon the usage patterns.

In another aspect, the analytics processor can consider one or more client-specific attributes when updating references as described within step 430. For example, when a client accesses a first page of a Website, the client can be identified in some manner. In some cases a user is required to log into a system, in which case the user and client can be specifically identified. For example, the analytics processor can determine or access stored attributes for the client, a usage history for the identity, or the like. In another example, where login is required, the user's usage of different social media Websites or services can be evaluated to determine attributes, e.g., interests or the like via keyword searches within the social media sources for the user, etc. In other cases, the client can be correlated with a client history, e.g., on-site analytics associated with the client, without determining a specific identity for the client and/or user.

The various attributes that can be determined for a client can include those discussed for on-site analytics. Further attributes can include, but are not limited to, the classification (e.g., group or usage pattern) of the current page viewed by the client, the history of the current session for the client, the total history for the client including prior sessions, time of the day, or other personalized information.

Having determined one or more parameters for the client, the analytics processor can update references on the page that is requested by the client prior to sending the page to the client. In illustration, a first usage pattern can specify that clients interested in pages of classification A frequently visit pages of classification B. A second usage pattern can indicate that clients that visit pages of classification A visit pages of classification C, albeit with less frequency than such clients visit pages of classification B. Again, for purposes of illustration, each usage pattern can be assigned to a different server. Thus, in the general case, when a client requests a page that includes a reference to an item of data, e.g., item A, within classification A, there exists a likelihood that the client may also visit a page of classification C, and a stronger likelihood that the client may visit a page of classification B.

In this case, any ambiguity as to whether the client should be directed to the server with the first usage pattern or the server with the second usage pattern can be resolved using the client specific attributes described. For example, the analytics processor can determine that, based upon the usage history of this particular client, the client visits pages of classification C with greater frequency than pages of classification B when, or after, visiting pages of classification A. Thus, the behavior of this particular client is unlike the general case that considers overall clients accessing the server cluster. Accordingly, responsive to the request for the page by the client, the analytics processor can update the reference to item A prior to sending the page to the client. Accordingly, were the client to select the reference, the client is directed to the server assigned the second usage pattern. In this example, while both servers include cached versions of item A, the client is directed to the server more likely to have additional items deemed desirable by the client stored in cache. Without reference to client specific attributes, the reference to item A in the page requested by the client would direct the client to the server assigned the first usage pattern.

Figure 5:
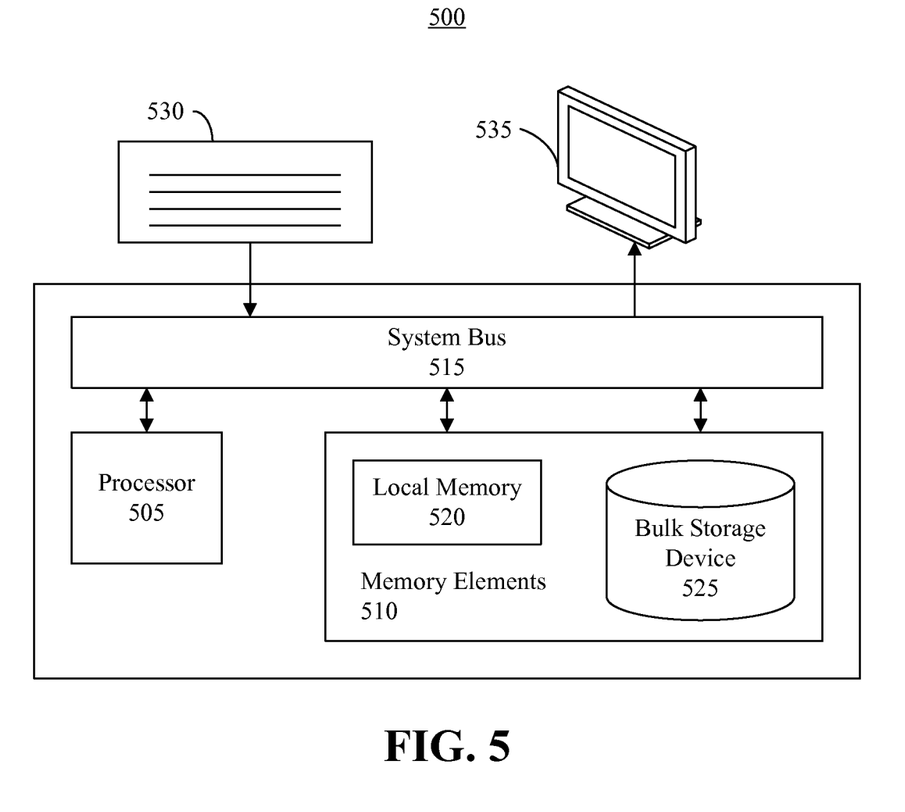
FIG. 5 is a block diagram illustrating an example of a data processing system in accordance with another embodiment disclosed within this specification.

FIG. 5 is a block diagram illustrating an example of a data processing system 500 in accordance with another embodiment disclosed within this specification. Data processing system 500 illustrates an example of the type of system that can function as a client and/or as a server as described within this specification.

System 500 can include at least one processor 505 coupled to memory elements 510 through a system bus 515. As such, system 500 can store computer readable program code within memory elements 510. Processor 505 can execute the computer readable program code accessed from memory elements 510 via system bus 515. In one aspect, for example, system 500 can be implemented as computer that is suitable for storing and/or executing program code. It should be appreciated, however, that system 500 can be implemented in the form of any system comprising a processor and memory that is capable of performing the functions described within this specification, e.g., mobile computing systems or the like.

Memory elements 510 can include one or more physical memory devices such as, for example, local memory 520 and one or more bulk storage devices 525. Local memory 520 refers to random access memory or other non-persistent memory device(s) generally used during actual execution of the program code. Bulk storage device(s) 525 can be implemented as a hard drive or other persistent data storage device. System 500 also can include one or more cache memories (not shown) that provide temporary storage of at least some program code in order to reduce the number of times program code must be retrieved from bulk storage device 525 during execution.

Input/output (I/O) devices such as a keyboard 530, a display 535, and a pointing device (not shown) optionally can be coupled to system 500. The I/O devices can be coupled to system 500 either directly or through intervening I/O controllers. Network adapters also can be coupled to system 500 to enable system 500 to become coupled to other systems, computer systems, remote printers, and/or remote storage devices through intervening private or public networks. Modems, cable modems, and Ethernet cards are examples of different types of network adapters that can be used with system 500.

In the case of a client, for example, memory elements 510 can store client operational program code and/or application program code that facilitate operation of system 500 as a client described within this specification. In the case of a server, memory elements 510 can store server operational program code and/or application program code that facilitate operation of system 500 as a server described within this specification. For example, system 500 can be configured to operate as, or implement, an analytics processor.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system comprising:
  a memory storing computer readable program code; and
  a processor coupled to the memory, wherein responsive to executing the computer readable program code, the processor is configured to execute operations for load balancing comprising:
    segmenting data from a plurality of servers into usage patterns determined from accesses to the data;
    caching items of the data in at least one of the plurality of servers according to the usage patterns, wherein each of the plurality of servers is designated to cache items of the data of a particular usage pattern; and
    updating a reference to an item of the data specifying the server of the plurality of servers within which the item is cached.

2. The system of claim 1, wherein the reference comprises a hyperlink that is accessible via a page of a Website.

3. The system of claim 1, wherein the processor is further configured to execute an operation comprising:
  dynamically updating the reference to specify a universal resource identifier for the item, wherein the universal resource identifier specifies the server of the plurality of servers within which the item is cached.

4. The system of claim 1, wherein the processor is further configured to execute operations comprising:
  continually segmenting and caching according to an ongoing determination of usage patterns; and
  continually updating the reference to specify the server within which the item is cached.

5. The system of claim 1, wherein the processor is further configured to execute operations comprising:
  segmenting a selected item of the data into both a first usage pattern and a second usage pattern; and
  caching the selected item in a first of the plurality of servers configured to cache items of the data of the first usage pattern and a second of the plurality of servers configured to cache items of the data of the second usage pattern.

6. The system of claim 5, wherein the processor is further configured to execute operations comprising:
  responsive to an input from a client selecting a reference to the selected item, determining whether to direct the client to the first or the second server according to the usage patterns.

7. The system of claim 5, wherein the processor is further configured to execute operations comprising:
  responsive to an input from the client selecting a reference to the selected item, determining whether to direct the client to the first or the second server according to an identification of the client.

8. A computer program product for load balancing, the computer program product comprising:
  a computer readable storage medium having computer readable program code embodied therewith, the computer readable program code comprising:
  computer readable program code configured to segment data from a plurality of servers into usage patterns determined from accesses to the data;
  computer readable program code configured to cache items of the data in at least one of the plurality of servers according to the usage patterns, wherein each of the plurality of servers is designated to cache items of the data of a particular usage pattern; and
  computer readable program code configured to update a reference to an item of the data specifying the server of the plurality of servers within which the item is cached.

9. The computer program product of claim 8, wherein the reference comprises a hyperlink that is accessible via a page of a Website.

10. The computer program product of claim 8, wherein the computer readable program code further comprises:
  computer readable program code configured to dynamically update the reference to specify a universal resource identifier for the item, wherein the universal resource identifier specifies the server of the plurality of servers within which the item is cached.

11. The computer program product of claim 8, wherein the computer readable program code further comprises:
  computer readable program code configured to continually segment and cache according to an ongoing determination of usage patterns; and
  computer readable program code configured to continually update the reference to specify the server within which the item is cached.

12. The computer program product of claim 8, wherein computer readable program code further comprises:
  computer readable program code configured to segment a selected item of the data into both a first usage pattern and a second usage pattern; and
  computer readable program code configured to cache the selected item in a first of the plurality of servers configured to cache items of the data of the first usage pattern and a second of the plurality of servers configured to cache items of the data of the second usage pattern.

13. The computer program product of claim 8, wherein the computer readable program code further comprises:
  computer readable program code configured to determine whether to direct a client to the first or the second server according to the usage patterns responsive to an input from the client selecting a reference to the selected item.

14. The computer program product of claim 8, wherein the computer readable program code further comprises:
  computer readable program code configured to determine whether to direct a client to the first or the second server according to an identification of the client responsive to an input from the client selecting a reference to the selected item.

\* \* \* \* \*